United States Patent [19]
Gutsmann

[11] Patent Number: 5,311,314
[45] Date of Patent: May 10, 1994

[54] METHOD OF AND ARRANGEMENT FOR SUPPRESSING NOISE IN A DIGITAL SIGNAL

[75] Inventor: Dieter Gutsmann, Hamburg, Fed. Rep. of Germany

[73] Assignee: U.S. Philips Corporation, New York, N.Y.

[21] Appl. No.: 20,024

[22] Filed: Feb. 18, 1993

Related U.S. Application Data

[63] Continuation of Ser. No. 535,805, Jun. 11, 1990, abandoned.

[30] Foreign Application Priority Data

Jun. 20, 1989 [DE] Fed. Rep. of Germany ....... 3920004

[51] Int. Cl.$^5$ ............................................. H04N 5/213
[52] U.S. Cl. ..................................................... 348/607
[58] Field of Search ............ 358/36, 167, 177, 213.15, 358/155, 37, 166, 314, 336; H04N 7/12, 5/213

[56] References Cited

U.S. PATENT DOCUMENTS

| | | | |
|---|---|---|---|
| 3,603,725 | 9/1971 | Cutler | 178/6 |
| 3,720,786 | 3/1973 | Cutler | 178/7.1 |
| 3,749,829 | 7/1973 | Burns et al. | 178/6.8 |
| 3,772,458 | 11/1973 | May | 358/135 |
| 4,203,134 | 5/1980 | Christopher | 355/336 |
| 4,220,971 | 9/1980 | Lambeth | 358/167 |
| 4,376,289 | 3/1983 | Reitmeier | 358/314 |
| 4,485,399 | 11/1984 | Schulz | 358/36 |
| 4,647,972 | 3/1987 | Strehl | 358/160 |
| 4,682,251 | 7/1987 | Hirota et al. | 360/33.1 |
| 4,910,694 | 3/1990 | Walther | 358/314 |
| 4,953,034 | 8/1990 | Kanda | 358/336 |

Primary Examiner—James J. Groody
Assistant Examiner—Sherrie Hsia
Attorney, Agent, or Firm—Edward W. Goodman

[57] ABSTRACT

A method of and an arrangement for suppressing noise in a digital signal obtained by sampling an analog signal, more specifically a television signal, provide that always for two successive sample values, depending on their difference value, the second sample value is replaced by the preceding one if a predeterminable difference value is fallen short of.

5 Claims, 2 Drawing Sheets

METHOD OF AND ARRANGEMENT FOR SUPPRESSING NOISE IN A DIGITAL SIGNAL

This is a continuation of application Ser. No. 07/535,805, filed Jun. 11, 1990, now abandoned.

BACKGROUND OF THE INVENTION

1. Field of the Invention

The invention relates to a method of suppressing noise in a digital signal obtained by sampling an analog signal, more specifically a television signal, as well as an arrangement for implementing the method.

When sampling an analog signal, that is to say, when taking samples at continuous time intervals, at the so-called sample clock, the analog signal should ideally be represented accurately by the digital sample values. With a constant analog signal, the successive sample values should then always present the same value. But in practice, this ideal case can hardly be attained because noise is superimposed on the analog signal when adjusted, or disturbing noise appears during the sampling operation. This entails that, for example, with a constant analog signal, the digital sample values repeatedly assume changing magnitudes.

In the case of television signals, when in a picture picture-areas often appear having the same contents, this kind of noise or its entailing errors appears very clearly in the sample values.

2. Summary of the Invention

It is an object of the invention to provide a method of and an arrangement for suppressing noise of a digital signal, which method and arrangement are specifically suitable for digital television signals and cause a noise reduction of the digital signals, especially for sampled constant analog signals.

This object is achieved when implementing the method of suppressing noise according to the invention in that for each two successive sample values, the second sample value is replaced by the preceding sample value if the difference between these two falls short of a predetermined difference of value.

Depending on the range of application, a difference of value may be predetermined at which the successive sample values are no longer changed when a digital signal recovered from an analog signal by means of sampling falls short of this difference. This means that always when considering two sample values, every second value is assumed to be equal to the first when the difference between the two sample values does not exceed the predetermined difference. Only when this value difference is exceeded is the original magnitude of the second sample value retained. In this manner an effective noise reduction is achieved.

The magnitude of the predetermined value difference can be selected depending on the purpose for which the method is utilized. When, for example, implementing the method of reducing noise of a television signal, the value can be selected such that, on the one hand, not too many details are lost and, on the other hand, a proper noise reduction is effected.

Furthermore, the method is advantageous in that signal jumps are taken over in an undistorted manner; so the pulse behavior of the signal is not changed.

According to a further embodiment of the invention, it is provided that if a difference is found between the sample values in a predeterminable tolerance range around the predeterminable value difference, the second sample value is replaced by the mean value of the second sample value itself and the preceding sample value.

In this respect, in addition to the decision whether the available difference between two sample values exceeds or falls short of the predetermined difference value, another tolerance range around the predetermined difference value is considered. If the available difference value is situated in this tolerance range, the mean value is computed from the second sample value and its preceding sample value in order to replace the second sample value. The advantage of this procedure is that if a difference value is situated in the predeterminable tolerance range, the sample values more and more approach the correct value. For example, it may occur that the first sample value of a constant analog signal happens to be distorted by noise and is consequently erroneous. If the next sample values do not yet exceed the predeterminable value difference, the faulty value will then be taken over again and again. If a tolerance range is additionally provided around the predeterminable difference value and the procedure takes place in the above manner, the sample values are brought to the right level.

In a further embodiment of the invention, an arrangement for implementing the method comprises a multiplexer, to whose first input the unchanged sample values are applied, a delay element following this multiplexer and delaying each sample value by one sample clock and whose output signal is applied to a second input of the multiplexer, a subtractor to which the unchanged sample values as well as the output signal of the delay element are applied, and whose output signal, subsequent to a quantity formation, is applied to a comparator that compares the applied values to a predeterminable difference value, on which the multiplexer is switched to its first input if the predeterminable difference value is exceeded, and is otherwise switched to its second input.

Thus, the difference value between each actual, unchanged sample value and a sample value delayed by one sample clock, i.e. the preceding sample value, is applied to the comparator. The comparator compares this difference value to a predetermined difference value and controls the multiplexer in a manner such that it switches the actual sample value to its output only if the predeterminable difference value is exceeded by the two sample values. The multiplexer is otherwise switched to its second input, to which the output signal of the delay element is applied, that is, the sample value of the preceding sample clock. Then the desired noise reduction is effected.

According to a further embodiment of the invention the multiplexer has a third input to which the mean value of the actual, unchanged sample value and the output signal of the delay element is applied, and in that the multiplexer is switched to the third input if a difference value is situated in the tolerance range.

The above-mentioned improved approximation to the actual signal value can be achieved by using the arrangement, in that the third input of the multiplexer is activated just when the difference between the successive sample values is exactly situated in the tolerance range. In that case, the mean value of each actual, unchanged sample value and the output signal of the delay element is switched to the output of the multiplexer. It has the above-described consequence that if an initial value happens to be erroneous, the subsequent values are gradually brought up to the right level. But at the same time the effect of noise suppression is retained.

According to a further embodiment of the invention, an arrangement for implementing the method comprises, a multiplexer, to whose first input the sample values multiplied by a factor $$\frac{1}{1-K}$$

are applied and whose output signal is applied to its second input after a delay by one sample value and an addition by sample values delayed each time by one sample clock, and a subtractor to which the unchanged sample values and the sample values delayed by one sample clock are applied, and whose output signal, after quantity formation, is applied to a comparator that compares these to a predeterminable value difference value, upon which the multiplexer is switched to its first input if the difference value is exceeded, and is otherwise switched to its second input.

This arrangement operates in the same manner as the one described hereinbefore, insofar here too the actual sample value and a sample value delayed by one sample clock are compared and in response to this result the multiplexer switches either the actual or the delayed sample value to the output of the arrangement. But furthermore, a feedback loop is provided comprising a delay element that delays the output signal of the multiplexer by one sample clock. A multiplier multiplying the signal by a constant factor is inserted after this delay element. The output signal of the multiplier is added to the input signal delayed by one sample clock. This sum is applied to the second input of the multiplexer which is then activated if the difference between two successive sample values falls short of the predeterminable difference value. So in this case, this feedback loop operates as a low-pass filter, so that the noise is gradually ascertained and in this manner any erroneous initial value is gradually brought to the correct set value of the signal.

Since in response to the factor of the multiplier, the feedback loop, operating as a low-pass filter, presents a gain which is unequal to 1, a second multiplier is inserted before the first input to the multiplexer, which second multiplier multiplies the actual input signal by the the signals available at the two inputs of the multiplexer present the same gain.

BRIEF DESCRIPTION OF THE DRAWINGS

The invention will be further explained by means of exemplary embodiments with reference to the drawings, in which.

DESCRIPTION OF THE PREFERRED EMBODIMENTS

Figure 1:
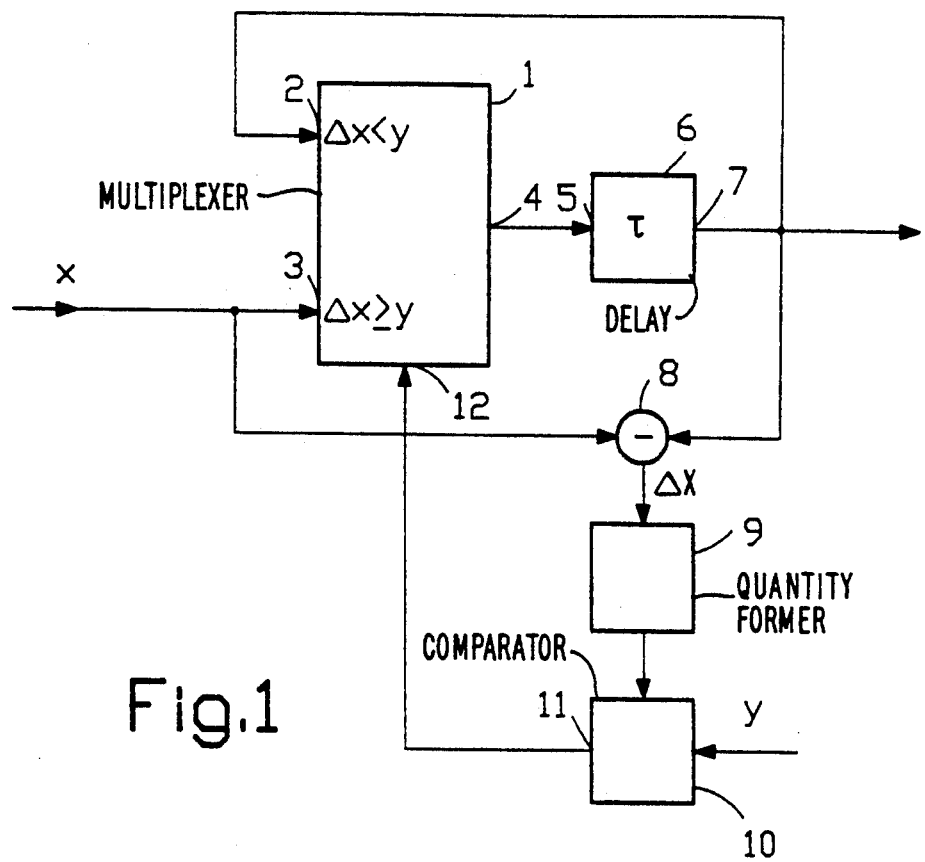
FIG. 1 shows an embodiment of an arrangement according to the invention.

The arrangement represented in FIG. 1 comprises a multiplexer 1 having a first input 3 and a second input 2. An input signal X, representing a digital signal, that is to say, clocked time-consecutive digital signal values, is applied to the first input 3 of the multiplexer. An output 4 of the multiplexer 1 is connected to an input 5 of a delay element 6 which delays by a sample clock the signals applied thereto. An output 7 of the delay element 6 is connected to the second input 2 of the multiplexer 1 and also to a subtractor 8. The signal available at the output 7 of the delay element 6 furthermore represents the output signal of the arrangement, that is to say, the input signal whose noise level has been reduced.

To the subtractor 8 is also applied the unchanged input signal X. The difference between the output signal of the delay element 6 and the input signal X, to be formed by the subtractor 8, is applied to a circuit element 9 which forms the quantity of the output signal of the subtractor. A comparator 10, to which is also applied a predeterminable difference value Y, is inserted after this circuit element 9. An output 11 of the comparator 10 is connected to an input 12 of the multiplexer 1.

This arrangement operates such that by means of the subtractor 8, the quantity former 9 and the comparator 10, the differences between the pairs of successive sample values are compared continuously. If the difference between two sample values falls short of the predetermined difference value Y, the comparator 10 switches the multiplexer 1 to its second input 2 by means of the signal available at the comparator output 11. The result is that the first sample signal delayed by means of the delay element 6 again reaches the delay element 6 via the second input 2 of the multiplexer 1. This implies that the output signal of the delay element 6 does not change at the delay output 7. The value of the second signal sample has thus been replaced by the value of the first signal sample. This process is repeated until the ascertained difference of value exceeds or is equal to the predetermined difference value. In this case, the comparator 10 switches the multiplexer 1 to its first input 3, so that the second sample value arrives at the output 4 of the multiplexer and at the output of the arrangement via the delay element 6. In that case, the sample values are transferred unchanged to the output of the arrangement, at any rate always delayed by one sample clock.

Figure 2:
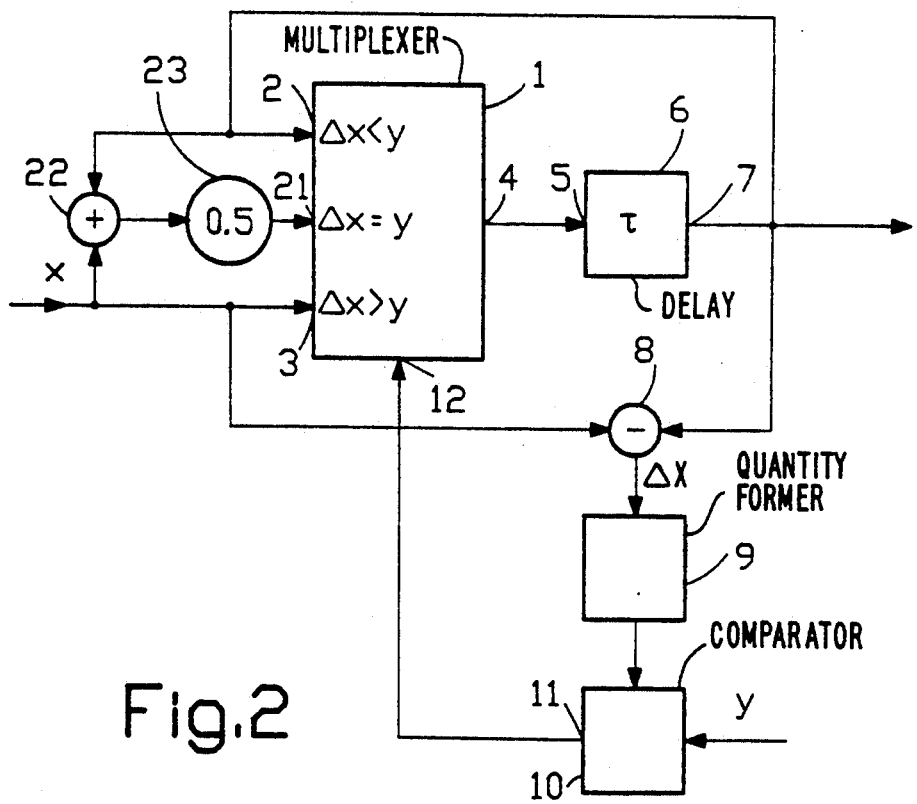
FIG. 2 shows an arrangement as shown in FIG. 1 incorporating a tolerance range around the predeterminable value difference.

The arrangement represented in FIG. 2 functions in a manner similar to that of FIG. 1. However, in the arrangement as shown in FIG. 2, a tolerance range around the predeterminable difference value is taken into consideration in addition to this predeterminable difference value with which a third input 21 of the multiplexer 1 is activated. The signal applied to this input 21 of the multiplexer 1 is obtained in a manner such that the signal available at the output 7 of the delay element 6 and the unchanged input signal X are applied to an adder 22 whose output signal is applied to a multiplier 23. This multiplier 23 multiplies the signal applied thereto by the factor 0.5. The output signal of the multiplier 23 is then applied to the third input 21 of the multiplexer 1.

This arrangement shown in FIG. 2 functions in a manner similar to the one represented in FIG. 1. However, the fact is also considered whether the measured difference value is situated in a tolerance range around the predetermined difference value Y. If it is, the third input 21 of the multiplexer 1 will be activated. Then the mean value of the actual sample value and the sample value delayed by one sample clock will be transferred to output 4 of the multiplexer 1, to arrive at the output 7 of the delay element 6 after a delay of one sample clock.

If the found difference value is situated outside the tolerance range, in a way similar to that described with respect to the arrangement of FIG. 1, the second input 2 wall be activated when the tolerance range is fallen short of and the first input 3 will be activated, i.e. connected to the output 4 of the multiplexer 1, when the tolerance range is exceeded.

Figure 3:
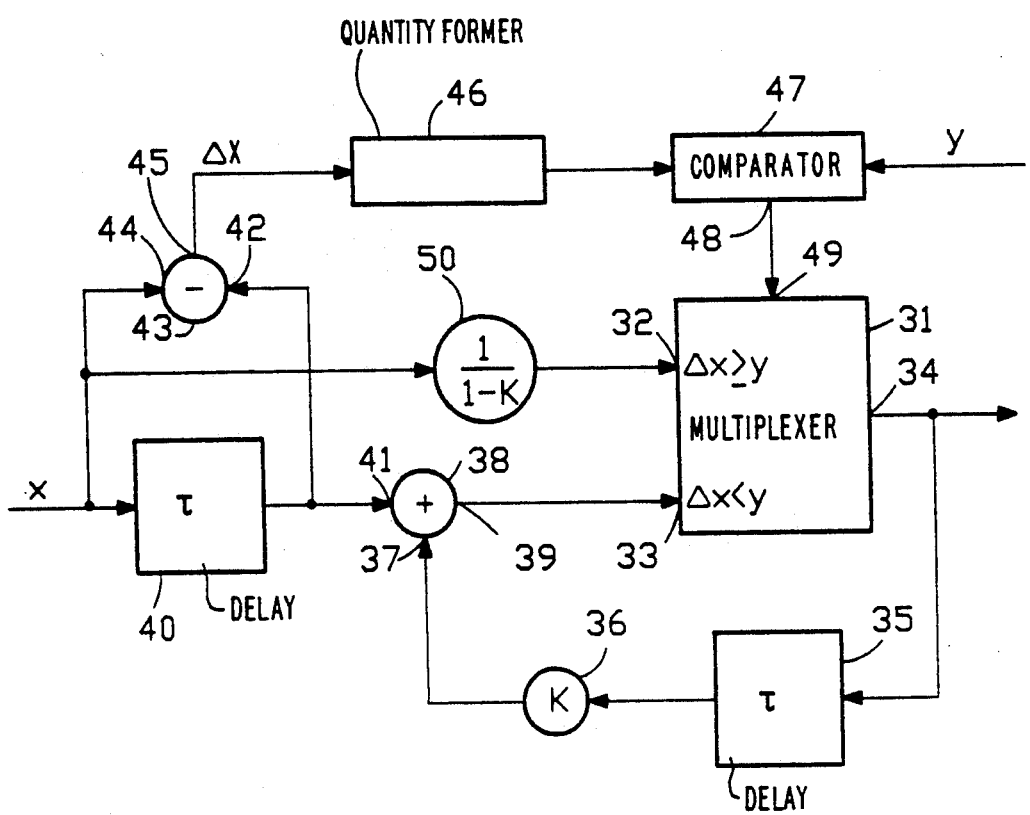
FIG. 3 shows a further embodiment comprising a low-pass filter loop.

A second embodiment of the arrangement, represented in FIG. 3, comprises a multiplexer 31 having first and second inputs 32; 33. An output 34 of the multiplexer 31 provides the output signal of the arrangement, which signal is furthermore applied to a delay element 35 in which the signal is delayed by one sample clock. A multiplier 36, in which the signal is multiplied by a constant factor K, is inserted after the delay element 35. The output signal of the multiplier 36 is applied to a first input 37 of an adder 38. An output 39 of this adder is connected to the second input 33 of the multiplexer 31.

The input signal X, i.e. the sequence of the actual unchanged sample values, is applied to a delay element 40 whose output signal is fed to both a second input 41 of the adder 38 and to a first input 42 of a subtractor 43. The unchanged input signal X is applied to a second input 44 of the subtractor 43. An output 45 of the subtractor 43 is connected to a quantity former 46 after which a comparator 47 is inserted. Furthermore, a predetermined difference value Y is applied to the comparator 47. An output 48 of the comparator 47 is connected to a further input 49, of the multiplexer 31. In response to the signal available at this input 49, the multiplexer 31 switches to its first or second input.

The unchanged input signal X is furthermore applied to a multiplier 50 connected to the first input 32 of the subsequent multiplexer 31. In the multiplier 50, the signal is multiplied by a factor $$\frac{1}{1-K}.$$

This circuit arrangement operates in a manner such that in the comparator 47, the difference between the actual input signal and the signal delayed by one sample clock in the delay element 40 and applied as a quantity is compared to the predetermined value difference value Y. If the actual difference value falls short of the predetermined difference value Y, the multiplexer 31 will be switched to its second input 33. The sum of an input signal X delayed by one sample clock and the signal of the feedback loop, comprising the delay element 35 and the multiplier 36, is applied to this second input 33 of the multiplexer 31. This feedback loop operates as a low-pass filter so that fast signal changes, and thus especially noise, are gradually determined.

If the actual difference value exceeds the predetermined difference value Y, the multiplexer 31 will be switched to its first input 32 by means of the comparator 47, or the signal available at the comparator output 48. To this input 32, the actual input signal X is applied, multiplied though, by the factor $$\frac{1}{1-K}.$$

This factor produces the same gain as the feedback loop consisting of the delay element 35 and the multiplexer 31. This is necessary for the signals available at the two inputs 32 and 33 of the multiplexer 31 to be available amplified to the same extent. If the first input 32 is activated, the actual input signal X amplified by the factor $$\frac{1}{1-K}$$

will be available at the output 34 of the multiplexer 31.

This circuit arrangement represented in FIG. 3 differs from the first exemplary embodiment especially in that due to the feedback loop operating as a low-pass filter, when there is a constant input signal X, the effect of high-frequency interference, i.e. more specifically noise, is not noticeable or is determined rather fast. If the predetermined difference value is not reached, not only is a constant value applied to the output of the arrangement, but the value is also corrected by means of the low-pass filter until the output value of the arrangement corresponds approximately to a mean value of the noisy input signal X. In this way both a proper noise reduction and a good accuracy of the output signal is obtained.

I claim:

1. A method for suppressing noise in a digital signal obtained by sampling an analog signal, said method comprising the steps:
   determining a difference between a first sample value and second sample value, said first sample value being delayed by one sample clock with respect to said second sample value;
   comparing the determined difference to a predetermined difference value; and
   replacing said second sample value with said first sample value if said determined difference is less than said predetermined difference value.

2. A method of suppressing noise as claimed in claim 1, characterized in that said method further comprises the steps:
   determining whether said determined difference is in a predetermined tolerance range around said predetermined difference value; and
   replacing said second sample value with a mean value of said second sample value and said first sample value if said determined difference is in said predetermined tolerance range.

3. An arrangement for suppressing noise in a digital signal obtained by sampling an analog signal, said arrangement comprising:
   a multiplexer having a first input for receiving sample values, and an output;
   a delay element coupled to the output of said multiplexer for delaying each sample value by one sample clock, said delay element having an output coupled to a second input of said multiplexer;
   a subtractor having a first input coupled to the output of said delay element, and a second input for receiving the sample values applied to the first input of said multiplexer;
   a quantity former coupled to an output of said subtractor; and
   a comparator coupled to an output of said quantity former for comparing an output signal therefrom to a predetermined difference value, an output of said comparator being coupled to a control input of said multiplexer, whereby said multiplexer is switched to the first input thereof if the predetermined difference value is exceeded, and otherwise is switched to the second input thereof.

4. An arrangement as claimed in claim 3, characterized a in that said arrangement further comprises means for forming a mean value of the sample value applied to the first input of the multiplexer and an output signal of said delay element, said multiplexer further comprises a third input to which said mean value is applied, and said comparator further determines whether the output signal from said quantity former is within a predetermined tolerance range of said predetermined difference value, whereupon said comparator causes said multiplexer to switch to the third input thereof.

5. An arrangement for suppressing noise in a digital signal obtained by sampling an analog signal, said arrangement comprising:

a first multiplier for multiplying sample values by a factor $1/(1-K)$, where K is a predetermined constant value;

a multiplexer having a first input coupled to an output of said first multiplier, and an output;

a first delay element coupled to the output of said multiplexer for delaying the sample values each time by one sample clock;

a second multiplier coupled to an output of said first delay element for multiplying the delayed sample values by the factor K;

an adder having a first input coupled to an output of said second multiplier, and an output coupled to a second input of said multiplexer;

a second delay element having an input for also receiving the sample values applied to said first multiplier for delaying said sample values by one sample clock, and an output coupled to a second input of said adder;

a subtractor having a first and a second input coupled to the input and the output of said second delay element;

a quantity former coupled to an output of said subtractor; and a comparator for comparing an output signal of said quantity former to a predetermined difference value, an output of said comparator being coupled to a control input of said multiplexer, whereby said multiplexer is switched to the first input if said predetermined difference value is exceeded, and otherwise is switched to the second input.

* * * * *